United States Patent [19]

Barnard et al.

[11] Patent Number: 5,788,901
[45] Date of Patent: Aug. 4, 1998

[54] METHOD AND APPARATUS FOR MOLDING CONTINUOUS LENGTHS OF PLASTIC

[75] Inventors: Frederick M. Barnard, Grand Haven; Timothy C. Rozema, West Olive, both of Mich.; Martin J. Walsh, Brampton; Andrew C. Poste, Wiarton, both of Canada

[73] Assignee: Ecologix Corporation, Holland, Mich.

[21] Appl. No.: 640,254

[22] Filed: Apr. 30, 1996

[51] Int. Cl.[6] .......................... B29C 43/26; B29C 43/30
[52] U.S. Cl. .................. 264/165; 264/171.11; 264/248; 264/323; 264/325; 264/DIG. 69; 425/325; 425/327; 425/377; 425/380
[58] Field of Search ..................... 264/323, DIG. 69, 264/320, 122, 166, 165, 171.11, 248, 325; 425/376.1, 325, 327, 380, 377

[56] References Cited

U.S. PATENT DOCUMENTS

| | | |
|---|---|---|
| 3,477,101 | 11/1969 | Fritsch . |
| 3,947,255 | 3/1976 | Hartman et al. .................. 264/122 |
| 3,992,503 | 11/1976 | Henfrey et al. .................. 264/167 |
| 4,154,893 | 5/1979 | Goldman ........................ 264/46.1 |
| 4,321,227 | 3/1982 | Henfrey et al. .................. 264/167 |
| 4,323,340 | 4/1982 | Uhlig . |
| 5,075,057 | 12/1991 | Hoedl . |
| 5,088,910 | 2/1992 | Goforth et al. .................. 264/122 |
| 5,114,650 | 5/1992 | Franck et al. .................. 264/177.2 |
| 5,165,941 | 11/1992 | Hawley . |
| 5,217,655 | 6/1993 | Schmidt ........................ 264/177.2 |
| 5,252,054 | 10/1993 | Ehnert et al. . |
| 5,266,246 | 11/1993 | Johnson et al. .................. 264/323 |
| 5,401,154 | 3/1995 | Sargent . |
| 5,413,745 | 5/1995 | Andersson ...................... 264/323 |
| 5,516,472 | 5/1996 | Laver .......................... 264/122 |

OTHER PUBLICATIONS

Berins, "Plastics Engineering Handbook of the Society of the Plastics Industry, Inc." Fifth Edition, pp. 79–150; 251–269 (1991).

*Primary Examiner*—Jeffery R. Thurlow
*Attorney, Agent, or Firm*—Warner Norcross & Judd LLP

[57] ABSTRACT

A method and apparatus for producing continuous lengths of compression-molded material containing thermoplastic resin. Discrete lengths of extruded material are indexed through a compression mold. The mold forms, hardens, and integrally joins two successive extruded segments of material. A first molded segment is indexed forward leaving a trailing portion in the mold. A subsequent segment is extruded into the mold, and is integrally joined to the trailing portion by compressing the mold. Subsequent segments can be joined to produce a continuous profiled length formed from recycled thermoplastic material, while avoiding damage and downtime caused by contaminants in recycled material.

24 Claims, 4 Drawing Sheets

METHOD AND APPARATUS FOR MOLDING CONTINUOUS LENGTHS OF PLASTIC

BACKGROUND OF THE INVENTION

The present invention relates to plastic extrusion and molding, and more particularly to the formation of continuous lengths of recycled thermoplastics.

I. Extrusion Processes

Continuous lengths of thermoplastics having profile shapes—from simple tubing or rods to complex custom shapes—are typically made using screw extruders. A screw conveys a pellet or powdered thermoplastic feed mixture through a heated barrel in which the shearing energy generated by the screw and the heat conducted through the barrel melt or plasticize the mixture. "Plasticize" means converting a material from a solid phase to a homogeneous, semi-liquid phase by raising its temperature. The screw also forces the plasticized mixture through a die containing a nozzle with an orifice having the desired profile, thus generating a continuous length of a profiled extrudate. The profile extrudate is "pushed" by the extruder and "pulled" by profile pullers to a cooling area for hardening. After cooling, the profile extrudate is cut to desired lengths or coiled.

Ram or piston extruders can also make thermoplastic extrudate having a profile. However, the ram extrusion process is a batch process, and thus does not generate continuous lengths of extrudate.

Further, both of these conventional extrusion processes have difficulty processing recycled materials to continuous profiled lengths. Recycled thermoplastic resins contain contaminants such as paper, tape, labels, metal, dirt, sand, and other materials not intentionally formulated into the feed. These contaminants often damage conventional extruder components and clog the die orifice. Although conventional extruders may contain breaker plates and screens upstream of the orifice to minimize damage by contaminants, the contaminants in recycled material frequently clog the screen, forcing shutdowns to clean the screen. Cleaning or processing the recycled material to remove the contaminants prior to extrusion increases the cost of extruding recycled materials.

II. Molding Processes

It is also known to injection mold or compression mold thermoplastics to form discrete molded pieces.

In the injection molding process, plasticized material is forced by screw extrusion or by an injection plunger through a nozzle into a closed mold. Pressure is maintained on the material in the mold while it cools and solidifies to a point where the mold can be opened and the molded piece ejected.

Compression molding is used principally for thermosetting resins; however, compression molding has been used with thermoplastics. In the compression molding process, a two-piece mold provides a cavity in the shape of the desired molded piece. The mold is heated, and the molding material is loaded into the lower half of the mold. The two mold halves are brought together under pressure. The molding material, softened by heat and pressure, is compressed into the shape of the cavity. A thermoplastic molding material is hardened by chilling it under pressure in the mold; whereas, a thermosetting plastic molding material is hardened by further heating it under pressure in the mold.

SUMMARY OF THE INVENTION

The aforementioned problems are overcome in the present invention comprising a process and apparatus for making continuous lengths of molded thermoplastic-containing material. More specifically, a thermoplastic-containing material is plasticized, and a segment of the plasticized material is extruded into a compression mold. The compression mold closes to compress and hardened the extrudate segment to form a profiled segment. The compression mold is opened, and the profiled segment is indexed forward to leave a trailing portion in the compression mold. A subsequent extrudate segment is extruded into the compression mold, which closes to form and harden the subsequent extrudate segment while integrally connecting it to the trailing portion of the previously molded and hardened profiled segment. Thus, the two segments are joined to form a continuous length. The steps can be repeated to run in continuous production to increase the length of the compression-molded extrudate.

In one aspect of the invention, the recycled thermoplastic-containing materials are extruded through large-diameter nozzles. Continuous profiled lengths of recycled thermoplastic-containing material are formed without damaging or clogging the extruder or nozzle orifice with particles of contamination from the recycled material, thus avoiding costly downtime caused by unscheduled interruptions for repairs or cleaning. Further, high capacities for extruding thermoplastic-containing materials are achieved because of reduced extrusion operating pressures, and the final cooling of the extrudate outside of the extrusion die.

These and other objects, advantages, and features of the invention will be more readily understood and appreciated by reference to the detailed description of the preferred embodiment and the drawings.

DETAILED DESCRIPTION OF THE PREFERRED EMBODIMENT

The present invention is a method and apparatus for forming continuous lengths of material containing thermoplastic resin. The method and apparatus can be used to process virgin materials or to process mixtures containing recycled thermoplastic resin.

Figure 1:
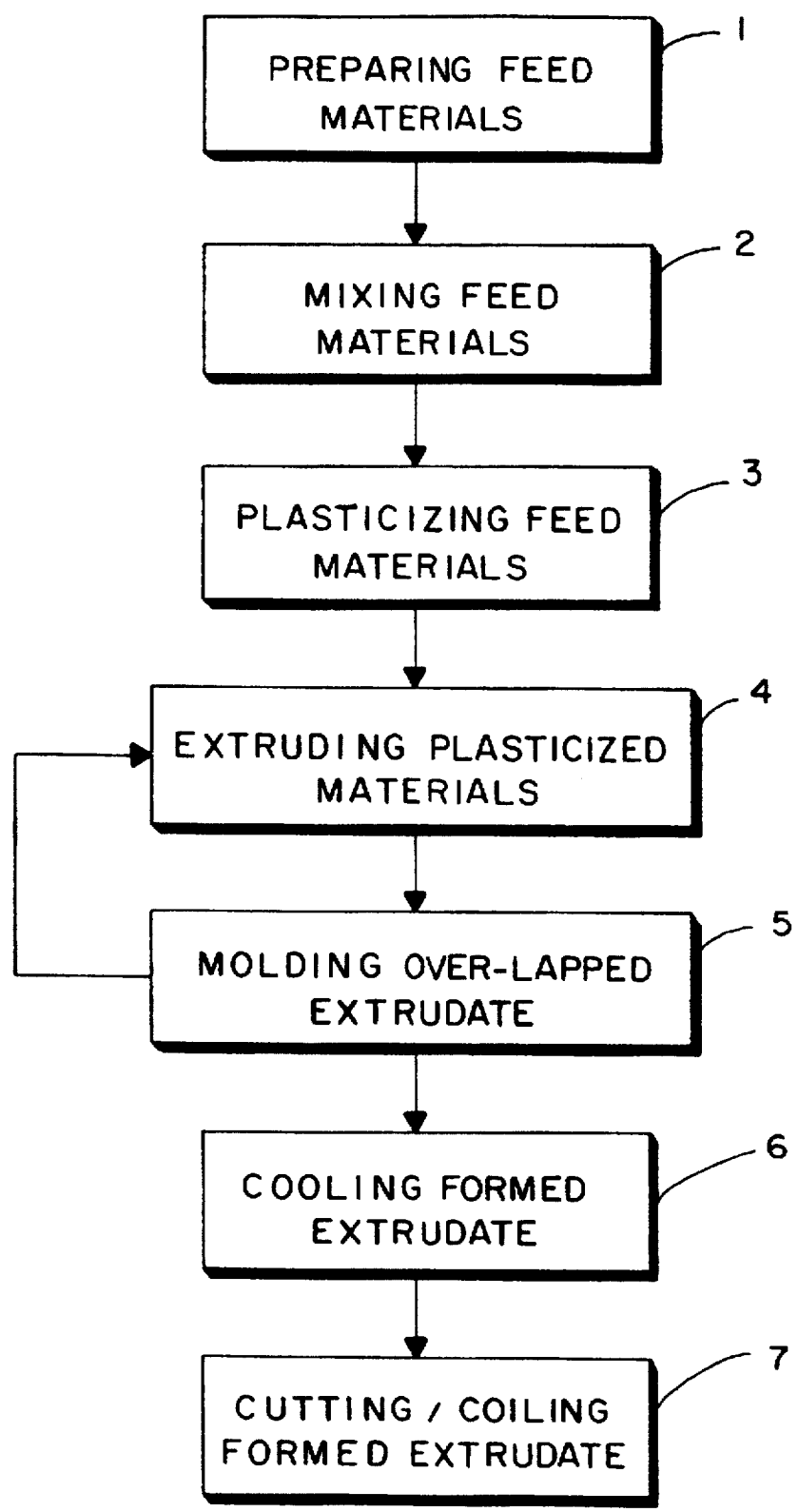
FIG. 1 is a flow chart illustrating the method steps of the present invention.
Figure 2:
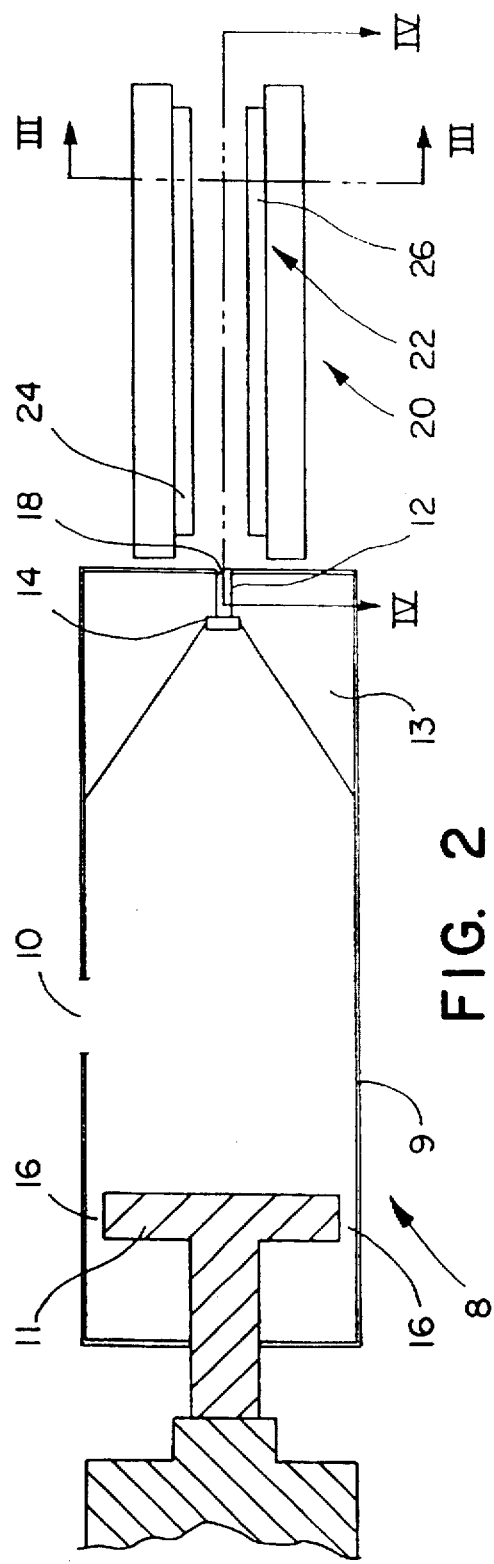
FIG. 2 is an elevation sectional view of the extruder and compression mold of the present invention.
Figure 4:
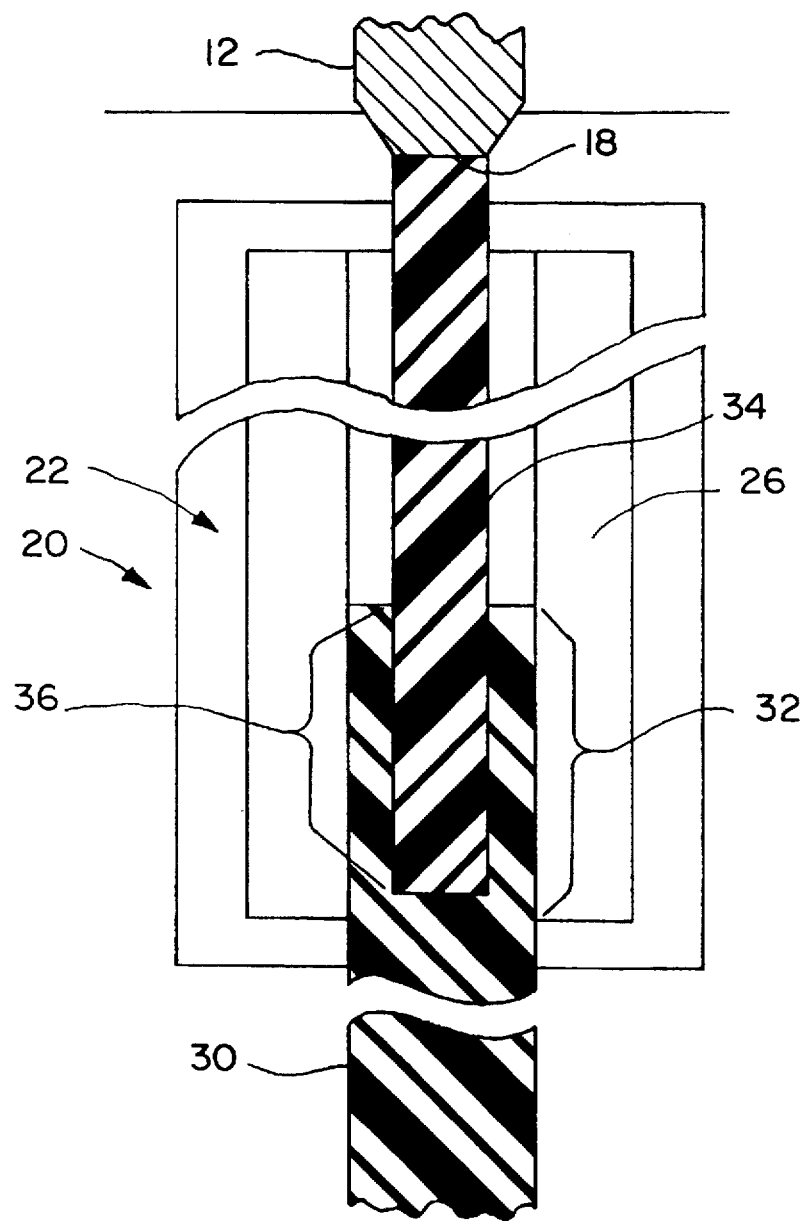
FIG. 4 is a sectional view taken along line IV—IV of FIG. 2.
Figure 5:
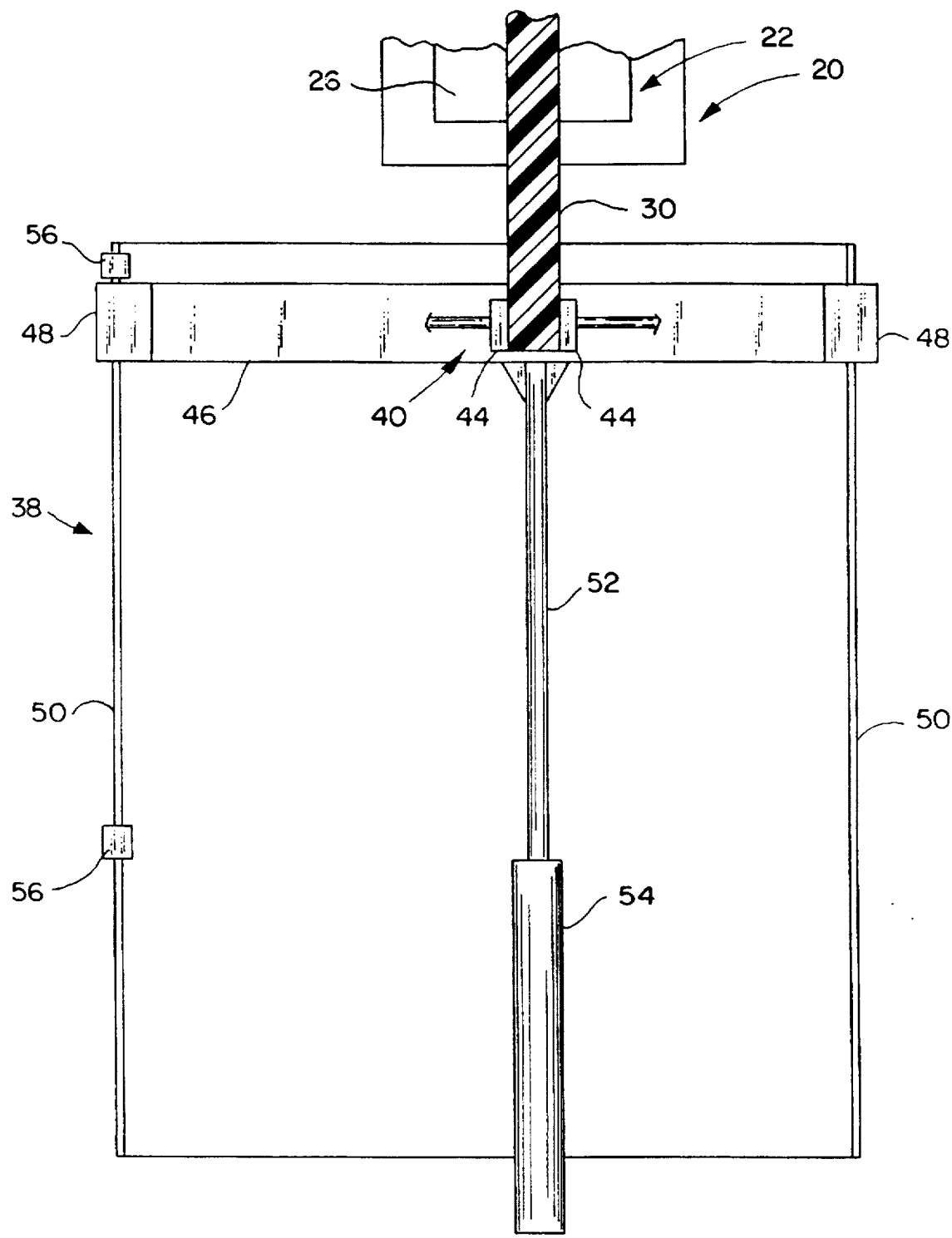
FIG. 5 is a plan view of the puller of the present invention.

FIG. 1 shows the steps of the process of the present invention; and FIGS. 2, 4, and 5 broadly show an apparatus of the present invention. Thermoplastic-containing feed materials are blended, plasticized, and fed to ram extruder 8. The ram extruder 8 extrudes a portion of the plasticized material into press 20, which contains compression mold 22. The mold 22 compresses and hardens the extrudate, which is then indexed forward leaving a trailing portion 32 in the mold 22. Ram extruder 8 then extrudes another portion of plasticized material into press 20 to overlap the trailing portion 32. The mold 22 again compresses and hardens the extrudate to integrally join the overlapping extrudate portions to form a continuous length. Pulling device 38 moves the continuous length from the mold 22 for further cooling and cutting or coiling.

I. Feed Materials/Blending

Turning to FIG. 1 step 1, the feed materials are ground, densified, or pelletized using methods known to those skilled in the art. The feed materials must include a thermoplastic resin. "Thermoplastic resin" and "thermoplastic" mean any resin that can be repeatedly melted and solidified by heating and cooling. Thermoplastic resins include, for example, polyolefins (e.g., polyethylenes and polypropylenes), styrenic plastics (e.g., polystyrenes), vinyl plastics (e.g., polyvinyl chloride), thermoplastic polyesters, thermoplastic elastomers, and combinations thereof.

The feed materials can include a filler. Fillers include, for example, sand, fly-ash, sawdust, thermosetting resins, and fiberglass. If recycled materials are processed, the feed material may also contain contaminants, such as tape, paper, metal, chemicals, dirt, dust, wood, fiberglass, and fiber.

Turning to FIG. 1 step 2, the feed materials are blended or mixed to achieve the desired attributes in the end product. The range of ratios and amounts of the materials required for a given attribute in the end product are known to those of skill in the art. Mixing is accomplished using any of a number of known methods, using equipment such as ribbon, paddle, or tumble blenders.

II. Plasticizing

Referring to FIG. 1 step 3, the feed materials are melted or plasticized to create plasticized material. Any of a number of known methods can be used, such as single or twin screw extrusion, or high intensity mixing.

III. Extrusion

Referring to FIG. 1 step 4, the plasticized material next enters an extrusion cycle. Turning to FIG. 2, the plasticized material is extruded, preferably using a ram extruder, shown generally as ram extruder 8. The plasticized material (not shown) enters the heated barrel 9 through barrel feed opening 10, shown in the open position. The barrel 9 can have a diameter of from about 3 inches to about 60 inches, preferably from about 4 inches to about 24 inches. Barrel-heating occurs by known methods, for example, conventional external band and strip heaters.

A ram or piston 11 moves the plasticized material forward to a heated cone-shaped block die 13, and through one or more extrusion nozzles 12 installed in the cone-shaped die 13, to produce an extrudate (not shown). The ram 11 is driven by methods known in the art, for example, by hydraulic or electric drive methods. In one aspect of the invention, the ram or plunger 11 is cooled below the melting point of the plasticized material to prevent plasticized material from sticking to the ram. Preferably, the ram 11 is cooled to a temperature ranging from about 100° F. to about 240° F. Ram cooling can be accomplished by circulating a cooling medium through voids or channels in the piston (not shown). Preferably, the ram or piston 11 has less than about an ⅛-inch clearance 16 between it and the barrel 9.

Preferably, the ram extruder 8 contains a separation device 14, such as a V-shaped flow diverter, to direct the flow of the plasticized material toward the extrusion nozzles 12. The separation device 14 is immediately upstream from the die 13 to eliminate dead spots in the flow of the plasticized material, as is known in the art.

The extrusion nozzle 12 can have varying orifice sizes and shapes. In one aspect of the invention, the extrusion nozzle 12 has an orifice 18 large enough to allow any contaminants in the plasticized material to pass through the extrusion nozzle 12 without damaging or clogging it, since contaminants are prevalent in recycled thermoplastic resins. Preferably, the extrusion nozzle 12 is at least about 0.5 inch in diameter. Also preferably, the orifice 18 is sized to create an extrudate segment whose volume matches the volume of the mold cavity 28 (FIG. 3) to reduce the need for cutting or "flashing" the excess hardened extrudate from the final product.

The operating pressure at the end of the nozzles 12 near the orifices 18 (i.e., the "nozzle pressure") is approximately 450 p.s.i.g. This pressure is relatively low when compared to prior art extrusion processes, and thus affords advantages of reduced operation and construction costs.

The temperature of the extrudate ranges from about 275° F. to about 400° F., depending upon the thermoplastic resin mixture in the feed. Table 1 shows the extrudate temperature for various thermoplastic resin mixtures.

TABLE 1

Extrudate Temperatures

| Plastic Type | HDPE | LDPE | PP | Extrudate Temperature (+/− 30° F.) |
|---|---|---|---|---|
| Mixture % | 100% | | | 275° F. |
| | | 100% | | 275° F. |
| | 90% | | 10% | 345° F. |
| | | 90% | 10% | 345° F. |
| | 80% | | 20% | 365° F. |
| | | 80% | 20% | 365° F. |
| | 70% | | 30% | 375° F. |
| | | 70% | 30% | 375° F. |
| | 60% | | 40% | 385° F. |
| | | 60% | 40% | 385° F. |
| | 50% | | 50% | 395° F. |
| | | 50% | 50% | 395° F. |
| | 40% | | 60% | 400° F. |
| | | 40% | 60% | 400° F. |

HDPE, LDPE, and PP mean high density polyethylene, low density polyethylene, and polypropylene, respectively.

IV. Compression Molding

Turning to FIG. 1 step 5, the extrudate next enters a compression molding step. Referring to FIG. 2, the extrudate (not shown) is pushed from the extrusion nozzle 12 to an open hydraulic or mechanical press 20 containing a two-piece mold 22 having top and bottom mold halves 24 and 26, respectively, shown in the open position in FIG. 2. Preferably, the extrudate is extruded directly into the mold. "Extruded directly" means that the extrudate passes to the mold before losing mulch of its plasticity through heat loss. One way to accomplish extrusion directly from the extruder 8 to the press 20 is to locate the press 20 immediately downstream from the extruder 8. "Immediately downstream" means the press 20 and mold 22 are only a minimal distance from the extrusion nozzle 12, for example, about ⅛ inch.

Figure 3:
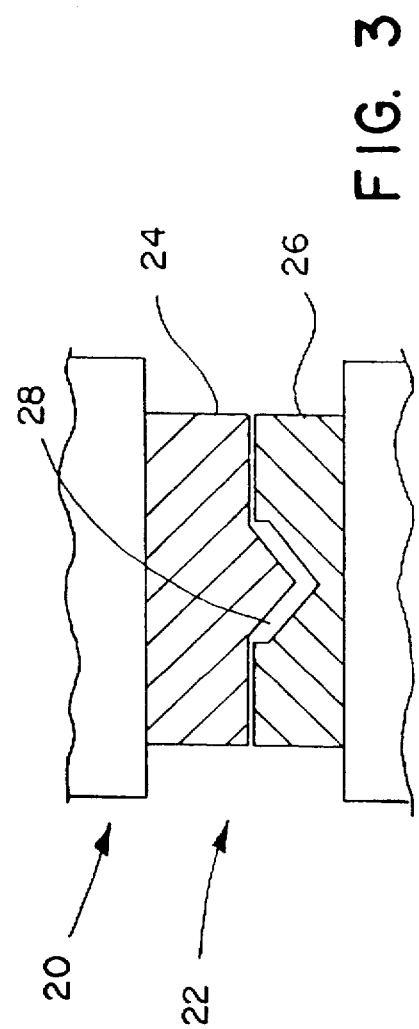
FIG. 3 is a sectional view taken along line III—III of FIG. 2.

Turning to FIG. 3, the press 20 closes to compress the extrudate within the mold 22, forming the extrudate under pressure until it conforms to the mold cavity 28, which defines the desired profile for the finished product. A residue of extrudate (not shown) may extend from the closed mold to the nozzle 12 (FIG. 2), for example, if the extrudate is squeezed out of the mold 22 as it is compressed.

The formed extrudate (not shown) is initially cooled in the closed mold 22 to harden the formed extrudate. "Hardened" here means sufficiently cooled so that the formed extrudate can be moved without significant deformation. Initial cooling can be accomplished by circulating a cooling medium (e.g., a glycol mixture at 20° F.) through channels or voids in the mold (not shown), as is known in the art. Sufficient cooling for initial hardening generally occurs once the "face" or surface temperature of the formed extrudate is reduced to approximately 170° F.

Several factors influence the amount of time required for the mold to remain closed to form and harden the extrudate. Generally, the amount of time required increases as (1) the temperature of the preformed extrudate increases, (2) the temperature of the mold 22 increases, (3) the thickness of the formed extrudate increases, and (4) the tolerance for deformation of the formed extrudate decreases. The required closure time varies primarily with the thickness of the formed extrudate. Depending on the mixture of the feed materials, the time required for closure of the mold ranges from about 0.1 second to about 10 minutes. Closure times of from about 6 seconds to about 10 seconds are typical.

V. Overlapped Extrudate

Continuing with step 5 of FIG. 1, the hardened extrudate is next overlapped with unformed, unhardened extrudate. Turning to FIG. 4, the mold 22 opens and the hardened, formed extrudate 30 is partially moved from the open mold, leaving a trailing portion 32 of the formed extrudate 30 in the mold 22. Preferably, the amount of formed extrudate remaining in the mold is about 6 inches.

Pulling device 383, shown generally in FIG. 5, moves the formed extrudate 30 from the open mold 22. Pulling devices or "pullers" are mechanical devices that contact and squeeze the material in order to move it downstream for further processing. These devices are known to those skilled in the continuous extrusion art. A preferred type of pulling device 38 has gripping section 40 with clamps 44 that pinch or grip the formed extrudate 30 so that the pulling device 38 can move the formed extrudate from the mold. The clamps 44 are mounted on beam 46, and are powered by air or hydraulic cylinders (not shown) to grip and release the formed extrudate 30. The beam 46 rests on bearings 48, which travel along lubricated shafts 50. The beam 46 is pulled or pushed by drive shaft 52, which is connected to beam 46 and powered by hydraulic cylinder 54. While a hydraulically powered drive shaft is shown, any suitably powered drive shaft system can be used, for example, an electronically driven ball and screw drive assembly, as is known in the art.

Preferably, the pulling device 38 is computer controlled, for example, by a standard programmable computer (not shown), as is known in the art. The computer generates electronic signals to control the timing and speed of the pulling device, that is, when to clamp and pull the formed extrudate 30, and when to release the formed extrudate and return to the starting position to begin another cycle. The extent of movement of beam 46 is limited by limit switches 56.

Turning again to FIG. 4, a second extrudate portion 34, which is generated using the above-described steps, is pushed from the extrusion nozzle 12 into the open mold 22 near the trailing portion 32 of the formed extrudate 30. Preferably, second extrudate portion 34 overlaps the trailing portion 32 to create overlap portion 36. The overlap portion 36 ranges from about 0.5 to about 6 inches. Also preferably, the nozzle 12 is offset or elevated above the bottom of mold cavity 28 (FIG. 3) by at least the thickness of the formed extrudate 30, so that as the extrudate portion 34 is pushed from the extrusion nozzle 12, extrudate portion 34 will pass over the top of the trailing portion 32. This offset or elevation of nozzle 12 helps to prevent "pile up" of extrudate in the mold.

The step of partially removing the formed extrudate 30 from the mold 22, and the step of pushing a second extrudate portion 34 into the open mold 22, occur about simultaneously, in order to maximize the speed of the process. "About simultaneously" means that the extrusion or pushing of the second extrudate portion 34 occurs without an extended delay before or after the removal of formed extrudate 30; for example, formed extrudate 30 is pulled about 0.1 to about 0.5 seconds after second extrudate 34 is pushed into the mold. Preferably, the extrudate 34 is pushed from the nozzle 12 before the formed extrudate 30 is pulled, to build up a "knob" or amount of extrudate (not shown) that helps prevent voids in the subsequently formed extrudate. Also preferably, formed extrudate 30 is pulled early enough so that the knob does not build to a point that increases the closing force required for the press 20 or increases the amount of material that must be trimmed or "flashed" from the formed extrudate 30. A suitable knob of extrudate develops if the extrudate 34 is pushed from nozzle 12 about 0.3 seconds before the formed extrudate 30 is pulled.

The mold 22 closes to compress the second extrudate portion 34 and the trailing portion 32 of formed extrudate 30. The closed mold forms the second extrudate portion 34 under pressure until it conforms to the mold cavity and becomes integrally formed or integrally connected to the trailing portion 32, thus forming a continuous length of compressed extrudate having a profile defined by the mold 22. "Integrally formed," "integrally connected," and "integrally joined" mean that the thermoplastic resin of the second extrudate portion is compressed to meld or mix sufficiently with the trailing portion so that the two segments are joined to form a continuous length of formed extrudate.

The continuous length of formed extrudate (not shown) does not depend upon the shape of the nozzle orifice 18 for its profile—rather, the nozzle 12 can contain a nozzle orifice 18 much larger than that required to produce the final shape or profile, thus allowing contaminants to pass freely. Further, the design and construction of the nozzle 12 is simplified, thus significantly reducing the cost of the nozzle. Also, the thickness of the extrudate can be easily changed simply by exchanging one nozzle for another nozzle having the desired nozzle orifice diameter.

After or as the second extrudate portion 34 and the trailing portion 32 are compression formed into a continuous length (not shown), the continuous length is initially cooled in the closed mold 22 to harden it, as was done to harden the previously formed extrudate 30. The initial cooling of the extrudate in the mold 22, rather than in the die 13 (FIG. 2), allows the use of a die that does not have cooling features—that is, a less costly die configuration. Further, since the die 13 does not need cooling capabilities, the cooling capacity of the die is not a limiting capacity factor as it often is for profile extruders. Also, initial cooling and hardening in the mold 22 occurs much more rapidly than cooling in the die of a profile extruder; thus, the present invention can achieve higher capacities than typical profile extruders.

The mold 22 opens to allow the pulling device to move the continuous length. As depicted by the arrow from step 5 to step 4 in FIG. 1, the cycle can begin again to add another extrudate portion to the continuous length. Preferably, the extrusion, molding, and pulling steps, and the devices to accomplish those steps, are computer-controlled to act in concert.

VI. Final Processing

Turning to FIG. 1 step 6, once the formed extrudate or continuous length is removed from the open mold, it is further hardened and cooled to about 140° F., for example, by using a chilled water bath (not shown).

Referring to FIG. 1 step 7, the formed extrudate is then either coiled or cut and stacked using known methods, such as saws, shears, or scissors.

The following examples are presented for the purpose of further illustrating and explaining the present invention and are not to be taken as limiting in any regard. Unless otherwise indicated, all parts and percentages are by weight.

EXAMPLE 1

A packaging cornerboard was made using a feed mixture of 60 percent commingled low-density, high-density, and linear low-density polyethylenes, which were contaminated with tape, labels, dust, dirt, and other residue, and 40 percent polypropylene, which contained fillers such as calcium carbonate commingled with polyethylene terephthalate (PET), polystyrene (PS), dirt, dust, tape, and labels. The feed mixture was plasticized to produce an extrudate having a temperature of 395° F. The plasticized extrudate was fed into the barrel of a ram extruder. The barrel was heated with several band heaters totaling 4000 watts, and one large band heater of 4000 watts to maintain a 500° F. barrel temperature, a 485° F. port side temperature, and a 450° starboard side temperature. The barrel of the ram extruder had an 8-inch diameter tapering to a 6-inch diameter. The ram piston had a diameter of 8-inches, and was cooled to about 240° F. face temperature by a glycol mixture. The stroke length of the ram was 18 inches. A 75 horsepower hydraulic power unit drove the ram; the unit having a hydraulic cylinder diameter of 6 inches to produce a minimum 1500 p.s.i.g. ram hydraulic pressure. The die of the ram extruder was heated using four rod heaters of 500 watts each, to produce a nozzle temperature of 400° F. to 550° F. The ram forced the plasticized feed mixture through two nozzles each having a length of 3.625 inches and an orifice diameter of about 0.67 inches. The ram extruder produced 1440 linear feet of extrudate per hour—8 linear feet per cycle at a 20 second complete cycle time. The extrudate was extruded into two mold halves defining two cavities each having the following dimensions: 2½"×2½"×60" V-shape 90° angle. Each nozzle fed a corresponding mold cavity. Each nozzle was positioned about 0.5 inches higher than the bottom of the mold cavity. The mold halves were attached to a hydraulic press having a stationary 48-inch by 60-inch bed. The mold height opening was 12 inches. The mold bottom face-temperature was 120° F. and the top face-temperature was 100° F. The temperatures of the mold faces were controlled by circulating a glycol mixture at 20° F. through channels in the mold. The press closed for seven seconds with a 40,000 p.s.i. force to form and harden the extrudate to a thickness of 0.220 nominal inches. The mold opened and the formed extrudate was indexed or pulled forward to leave six inches in the mold, which was overlapped two inches by a subsequent extrudate segment. The mold halves again compressed to join the two extrudate segments, using the processing conditions previously described. The process cycle was repeated to produce a continuous length that was cooled to 140° F. in a water bath. The continuous length was cut to 36-inch lengths of packaging cornerboard using a hydraulically driven shear. The continuous length formed from the compression molded extrudate segments did not snap or crack when bent.

EXAMPLE 2

A packaging cornerboard was made using the equipment and operating conditions of Example 1, except that the feed mixture contained 50 percent commingled low-density, high-density, and linear low-density polyethylenes, which were contaminated with tape, labels, dust, dirt, and other residue, and 50 percent polypropylene, which contained fillers such as calcium carbonate commingled with PET, PS, dirt, dust, tape, and labels. The band heaters were set to maintain the barrel temperature at 500° F. barrel temperature, 485° F. port side temperature, and 450° starboard side temperature. The continuous length formed from the compression molded extrudate segments was rigid, showing little flexibility.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents.

The embodiments of the invention in which an exclusive property or privilege is claimed are defined as follows:

1. A method of forming lengths of material containing thermoplastic resin comprising the sequential steps of:

plasticizing a mixture containing thermoplastic resin to form a plasticized feed;

extruding a first portion of the plasticized feed to form a first extrudate;

moving the first extrudate into a stationary, open compression mold;

closing the mold to compress the first extrudate;

hardening the first extrudate in the mold to form a first hardened length;

opening the mold;

extending a lead portion of the first hardened length out of the mold to leave a trailing portion of the first hardened length in the mold;

extruding a second portion of the plasticized feed to form a second extrudate;

moving the second extrudate into the open mold;

closing the mold to compress the second extrudate and integrally connect the second extrudate to the trailing portion of the first hardened length; and hardening the second extrudate to form a second hardened length continuous with the first hardened length.

2. The method of claim 1 wherein the step of moving the second extrudate into the open mold further comprises overlapping the trailing portion of the first hardened length with the second extrudate.

3. The method of claim 1 wherein the steps of extruding the first and second portions comprise extruding the plasticized material through a nozzle having an orifice of a diameter sufficient to allow contaminants in the plasticized material to pass through the nozzle without damaging the nozzle.

4. The method of claim 1 wherein the steps of extruding the first and second portions comprise extruding the plasticized material through a nozzle having an orifice at least about 0.5 inches in diameter.

5. The method of claim 1 wherein the steps of extruding the first and second extrusion portions comprise ram extruding.

6. The method of claim 5 wherein the ram extruding step further comprises using a cooled ram piston.

7. The method of claim 1 wherein the step of moving the second extrudate occurs about simultaneously to moving the first hardened length.

8. The method of claim 1 wherein the step of moving the second extrudate occurs prior to the step of moving the first hardened length.

9. The method of claim 1 wherein the first portion and the second portion are extruded directly into the open mold.

10. A method of forming a continuously molded length of material containing thermoplastic resin comprising:

contacting in a stationary, open compression mold a first thermoplastic-containing extrudate with a second thermoplastic-containing extrudate while the second extrudate is still hot from an extruder; and closing the open compression mold to apply pressure to join the first and second extrudates to form a continuous length, wherein a portion of the first extrudate extends outside the compression mold during the closing step.

11. A method of forming continuous lengths of compression-molded thermoplastic comprising:

extruding a first portion of plasticized thermoplastic into a stationary, open compression mold;

closing the mold to compress and harden the first portion to form a first segment;

opening the mold;

indexing the first segment forward leaving a trailing edge of the first segment in the mold;

extruding a second portion of plasticized thermoplastic into the open mold; and closing the mold to compress and harden the second portion to form a second segment integrally joined to the first segment.

12. The method of claim 11 further comprising the steps of:

opening the mold;

indexing the second segment integrally joined to the first segment forward leaving a trailing edge of the second segment in the mold;

extruding a third portion of plasticized thermoplastic into the open mold;

closing the mold to compress and harden the third portion to form a third segment integrally joined to the second segment.

13. The method of claim 11 further comprising the step of overlapping the trailing edge of the first segment with the second portion.

14. An apparatus for forming continuous lengths of thermoplastic containing material comprising:

means for plasticizing a material containing thermoplastic resin to form a plasticized feed;

means for extruding the plasticized feed to form a first extrudate;

stationary means for compressing and hardening the first extrudate to form a hardened profiled extrudate;

means for moving the hardened profiled extrudate from the compressing and hardening means to leave a trailing portion of the hardened profiled extrudate in the compressing and hardening means;

means for extruding the plasticized feed to form a second extrudate overlapping the trailing portion of the hardened profiled extrudate; and means for compressing and hardening the second extrudate overlapping the trailing portion of the hardened profiled extrudate to form a continuous length.

15. An apparatus for forming continuous lengths of compression molded segments of thermoplastic material comprising:

an extruder;

a stationary compression mold downstream from the extruder; and a puller downstream from the compression mold.

16. The apparatus of claim 15 wherein the compression mold is immediately downstream from the extruder.

17. An apparatus for forming continuous lengths of compression molded segments of thermoplastic comprising:

a ram extruder having a piston surrounded by a heated barrel, the ram extruder further having a heated die block at an end of the barrel, the die block surrounding at least one nozzle;

means for driving the piston to force plasticized thermoplastic through the nozzle to form an extrudate segment;

a press located immediately downstream form the nozzle, the press containing a stationary compression mold;

means for opening the mold, whereby the mold can receive the extrudate segment and release the extrudate segment;

means for closing the mold to compress the extrudate segment in the mold;

means for cooling the mold to harden the extrudate segment in the mold;

a pulling device located downstream from the press having means for partially withdrawing the extrudate segment from the mold; and means to sequentially control the piston driving means, the mold opening and closing means, the pulling device, first, to activate the piston to force the plasticized thermoplastic out the nozzle and into the mold about simultaneously to activating the pulling device to partially withdraw the extrudate segment, whereby a second extrudate segment overlaps a first extrudate segment that has been partially withdrawn from the mold;

second, to close the mold on the first and second extrudate segments, whereby the first and second extrudate segments are compressed to integrally form a continuous extrudate length comprised of the first and second extrudate segments hardened by cooling;

third, to open the mold; and fourth, to activate the pulling device to partially withdraw the continuous extrudate length from the mold.

18. The apparatus of claim 17 wherein the compression mold has a cavity defining a profiled length.

19. The apparatus of claim 17 wherein the pulling device includes grippers, means for closing the grippers to hold the extrudate segment, means for moving the grippers parallel to the extrudate segment, means for opening the grippers to release the extrudate segment, whereby the extrudate segment gripped by the pulling device may be partially moved from the mold.

20. The apparatus of claim 17 further comprising a separation device located in the barrel upstream of the nozzle.

21. The apparatus of claim 17 further comprising means for cooling the piston.

22. The apparatus of claim 17 wherein the continuous extrudate length has a thickness and the compression mold defines a cavity having a bottom, the nozzel being positioned above the bottom of the mold cavity a distance at least as great as the thickness of the continuous extrudate length.

23. The apparatus of claim 17 wherein the nozzle defines an orifice, the orifice having a diameter sufficient to allow contaminants in the plasticized thermoplastic to pass through the nozzle without damaging the nozzle.

24. The apparatus of claim 17 wherein the nozzle defines an orifice, the orifice having a diameter of at least about 0.5 inches.

* * * * *

UNITED STATES PATENT AND TRADEMARK OFFICE
CERTIFICATE OF CORRECTION

PATENT NO. : 5,788,901
DATED : August 4, 1998
INVENTOR(S) : Frederick M. Barnard et al.

It is certified that error appears in the above-indentified patent and that said Letters Patent is hereby corrected as shown below:

```
Column 10, Line 22:
   after "means," insert --and--
```

Signed and Sealed this

Fifth Day of January, 1999

Attest:

Attesting Officer

Acting Commissioner of Patents and Trademarks